United States Patent [19]
Wolf

[11] 3,845,446
[45] Oct. 29, 1974

[54] FOOT OPERATED RHEOSTAT
[76] Inventor: Tobin Wolf, 285 Aycrigg Ave., Passaic, N.J. 07055
[22] Filed: June 6, 1973
[21] Appl. No.: 367,536

[52] U.S. Cl. .............................................. 338/153
[51] Int. Cl. .......................................... H01c 5/02
[58] Field of Search .................... 338/153; 200/86.5

[56] References Cited
UNITED STATES PATENTS
| | | | |
|---|---|---|---|
| 1,718,957 | 7/1929 | Hillix | 338/153 |
| 2,308,199 | 1/1943 | Mullenbach | 338/153 X |
| 2,534,939 | 12/1950 | Alkire | 338/153 |

FOREIGN PATENTS OR APPLICATIONS
| | | | |
|---|---|---|---|
| 547,547 | 9/1942 | Great Britain | 338/153 |

Primary Examiner—J. V. Truhe
Assistant Examiner—David A. Tone
Attorney, Agent, or Firm—Jay M. Cantor

[57] ABSTRACT

A foot-operated rheostat is provided in the form of a flat enclosure for the resistance unit, which may rest on the floor and which is provided with a foot pedal pivoted at one end to the housing and extending thereover. As the pedal is pushed vertically toward the housing against a bias it causes movement of a contact arm horizontally along a resistance element within the housing.

5 Claims, 7 Drawing Figures

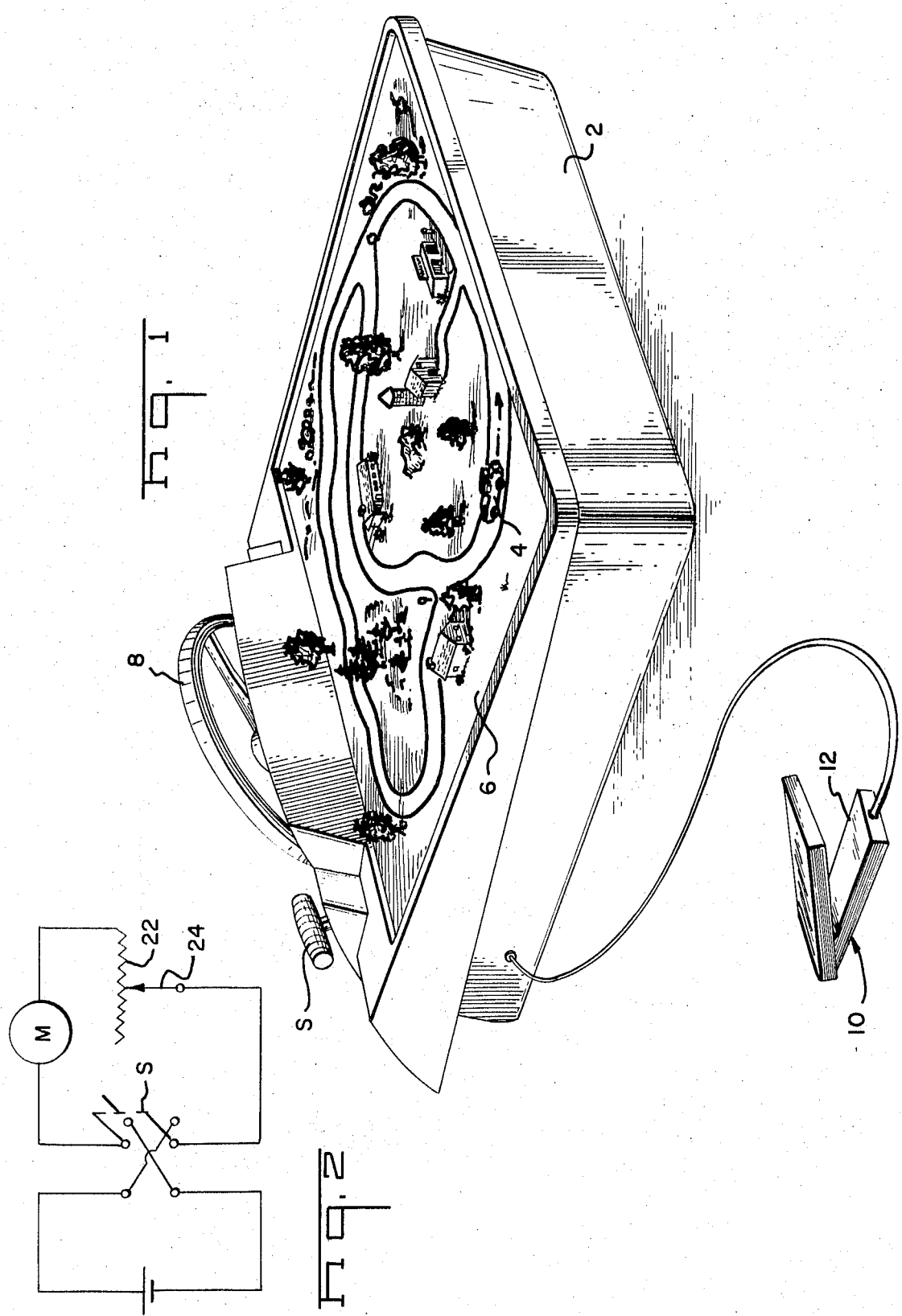

FOOT OPERATED RHEOSTAT

BACKGROUND OF THE INVENTION

In my U.S. Pat. No. 3,525,175, issued Aug. 25, 1970 and titled "Toy Simulating Realistic Driving Conditions," there is disclosed a toy automobile which is driven along a platform by a movable magnet below the platform. The movement of the magnet is controlled by a motor and a steering device, and its speed varied by varying the speed of the motor from a remote location adjacent to the steering wheel. The patent discloses the speed of the motor controlled by a rheostat which is adjusted by a manually operated handle adjacent to the steering wheel.

THE INVENTION

In order to provide more realistic conditions for driving the toy automobiles, it is proposed by this invention to control the speed of the motor, and consequently the vehicle, by a foot-operated pedal resting on the floor instead of the handle. Such pedal simulates the accelerator pedal of an automobile and thus adds to the realism. The foot-operated variable resistance device is in the form of a substantially flat housing within which is mounted a horizontally extending resistance element. A pedal overlying the housing, is pivotally mounted at one end thereof for vertical movements by the foot of an operator, a spring normally biasing the pedal away from the housing. Vertical movements of the pedal causes horizontal movements of a contact arm along the resistance element with which it is in engagement.

OBJECTS OF THE INVENTION

It is therefore an object of this invention to provide a foot-operated rheostat in which vertical movements of a pedal are converted to horizontal wiping movements of a contact arm over a horizontally disposed resistance element.

It is a further object of this invention to provide a rheostat having a movable contact arm which is biased against a resistance element by an insulator which supports it.

The above and further objects will become apparent as a description of the invention proceeds with specific reference to the figures of the drawing in which:

FIG. 1 shows the platform and toy vehicle thereon together with the controls for driving and steering the vehicle and including the foot-operated pedal of this invention;

FIG. 2 is a schematic of the control circuit for the motor which causes movement of the vehicle;

DESCRIPTION OF INVENTION

Figure 3:
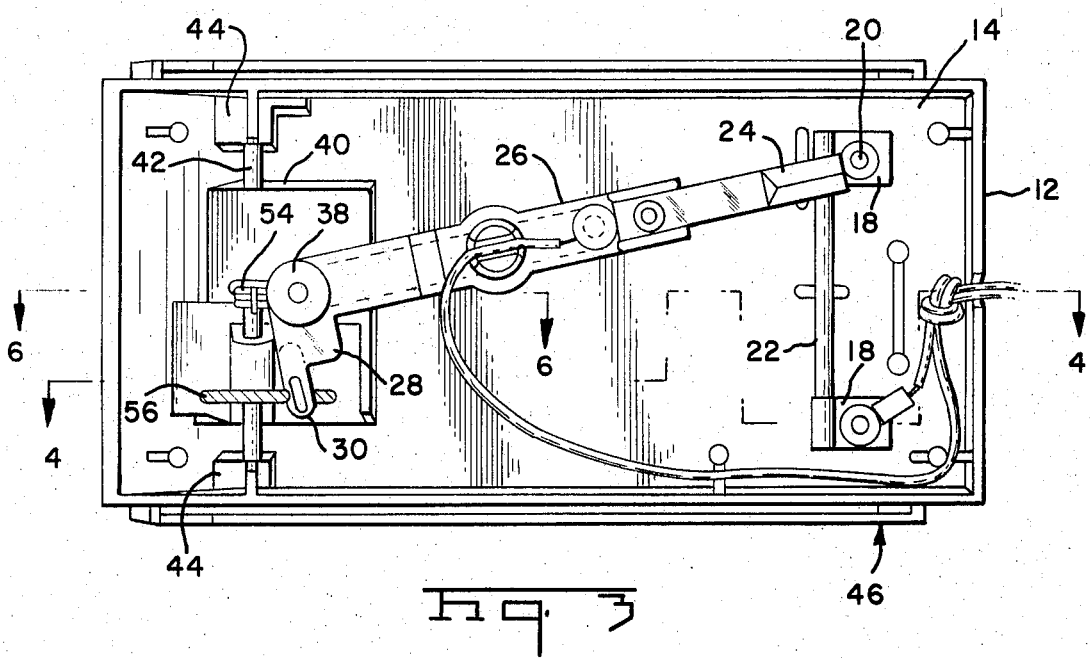
FIG. 3 is a view from the bottom of the foot-operated pedal.

The device shown in FIG. 1 is that shown and described in my above mentioned patent and, without an in depth description of the various parts, suffice it to say that casing 2 houses the motor M and all such other mechanism as to cause the toy vehicle 4 to move around along the platform 6. The steering wheel 8 controls mechanism within the casing for causing lateral movements of the vehicle during its forward or backward movements. The foot-operated rheostat 10 of this invention which is to be substituted for the rheostat of the patent, is connected by a lead to the electric motor M and its battery power supply within the casing for controlling the speed of the motor in a manner which is obvious from FIG. 2.

The foot-operated rheostat comprises a flat rectangular casing having top and side walls and may be open at the bottom, if so desired. Integral with the lower surface of the top wall 14 of the casing are a pair of spaced bosses 16 projecting inwardly of the housing. A bracket member 18 is secured to the free end of each of the bosses by a rivet 20. Each of the bracket members 18 is so shaped as to tightly receive and secure one end portion of a resistance element which extends between them and which may be in the form of a coiled resistance wire or of solid construction, as desired. At least one of the brackets 18 should be of conductive material in order to form an end terminal for the resistance element to which a lead may be electrically connected. A conductive contact 24 in movable engagement with the resistance element, is mounted at one end of an elongated lever arm 26 of insulation material. The lever arm is provided at its other end, with a laterally offset portion 28 which terminates at its free end in a finger 30 substantially parallel to the plane of the arm 26. The arm 26 is provided with an integrally formed tubular bearing member 32 protruding from one surface thereof at its junction with the laterally offset portion 28. A portion of one end of the top wall 14 of the casing intermediate the sides thereof, is depressed to provide an area 34. The lower surface of the depressed portion is provided with an integrally formed hollow boss 36 projecting therefrom which forms a shaft rotatably receiving the bearing member 32. A hollow headed rivet 38 which is force fitted into the hollow boss 36, maintains the arm 26 rotatably mounted on the boss by its laterally extending head overlying the exposed end of the vertically extending bearing member 32.

Figure 4:
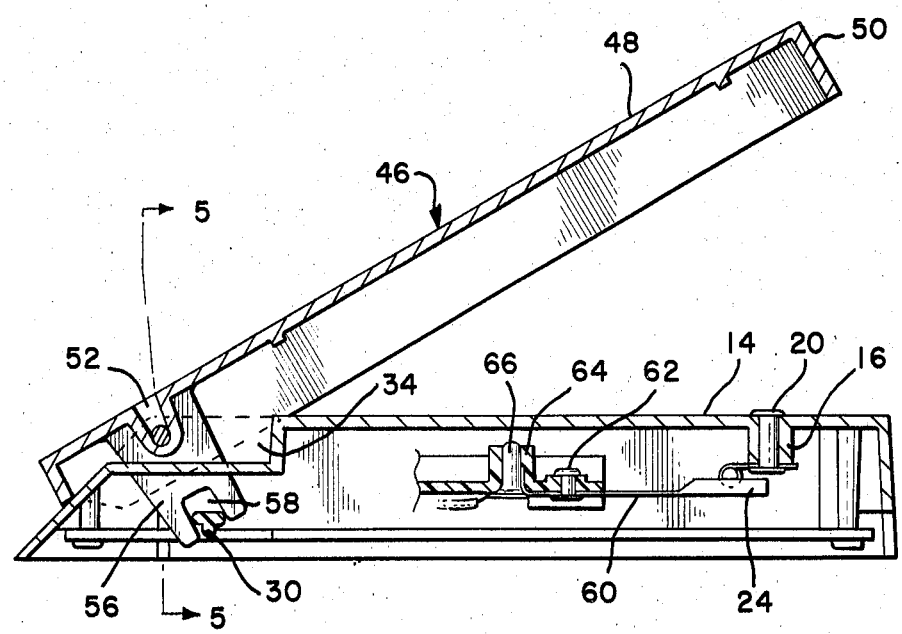
FIG. 4 is a cross-sectional view along line 4—4 of FIG. 3 and shows the parts thereof in section.
Figure 5:
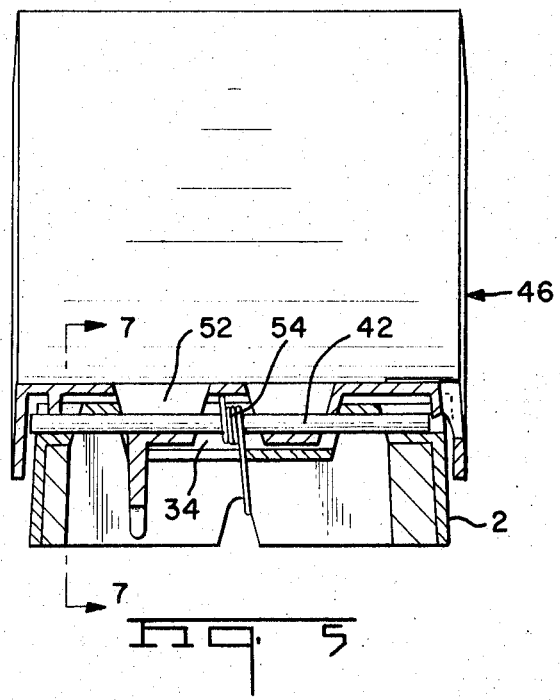
FIG. 5 is a cross-sectional view along line 5—5 of FIG. 4.
Figure 6:
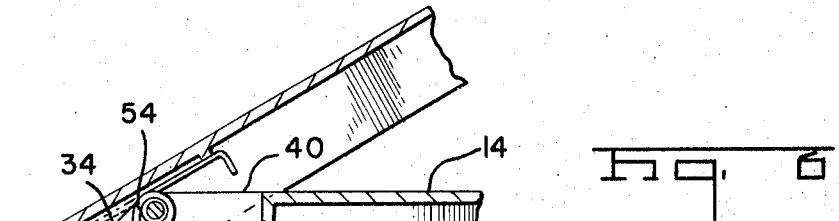
FIG. 6 is a cross-section view along line 6—6 of FIG. 3.
Figure 7:
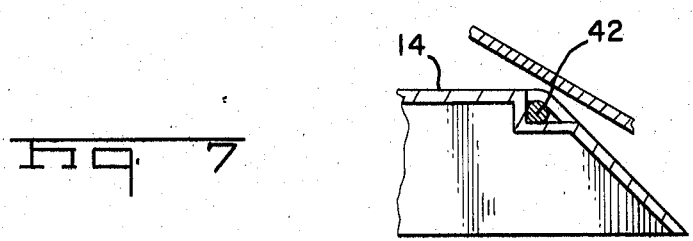
FIG. 7 is a cross-sectional view along line 7—7 of FIG. 5.

The side walls 40 of the area 34, formed by the depressed portion of the top wall, have aligned openings through which extends a horizontal shaft 42 with its free ends extending into openings provided in inwardly extending protuberances 44 integrally formed on the inner surfaces of the casing side walls. A rectangular foot-pedal 46 having a planar top wall 48 and side walls 50, is formed with a transversely extending depressed groove portion 52, the bottom wall of which is curved about an axis substantially in alignment with the openings in the side walls 40 forming the area 34. As can be seen in FIGS. 4 and 5 the bottom wall of the depressed groove portion extends into the area 34 formed in the top wall 14 of the casing and the shaft 42, when seated in the openings in the side walls 40, bears against the bottom of the groove 52 to maintain the pedal member 46 pivotally mounted to the casing. The bottom of the groove 52 in the pedal member is slotted to accommodate a coiled spring 54 surrounding the shaft 42, one end of the spring bearing against the lower surface of the top wall 48 of the pedal member and the other end of the spring extending through an opening in the wall 14 of the casing. The spring is so wound, as to normally bias the pedal member 46 away from the top wall of the casing The lower surface of the wall 48 of the pedal member is integrally formed with a downwardly extending wall 56 passing through an opening in wall 14 into the casing and is forked at its free end, as at 58, to receive the finger 30 of the lever arm 26 therein. With this construction, it can be seen that when the pedal member is pressed downwardly in FIG. 4, against the bias of spring 54, the lever arm 26 and consequently the contact member 24 will sweep over the resistance element in clockwise direction in FIG. 3, to vary the resistance between the contact member and a terminal of the resistance member. The contact member 24 is provided with a flat portion 60 which overlies the insulated arm 26 and is fixedly secured thereto by a headed rivet 62. The arm 26 is provided with a hollow protrusion 64 into the bore of which is force fitted the end of a lead, a conductive pin 66 and the upset end of the flat portion 60 of the contact 24 in electrical contact with each other. The material of the arm 26 is an insulating plastic material, such as nylon, for example, which is inherently resilient and biases the contact member against the resistance element 22 in its sweeping movements thereover, Alternatively, the portion 60 of the contact member may be of resilient material to bear against the resistance element 22, and the insulation arm may be of rigid material. Both the casing 2 and pedal member 46 may be of plastic material molded into the desired shape and form. As seen in FIG. 4, upward movement of the pedal 46 is limited by engagement of a portion of the side wall 50 thereof with an adjacent portion of the side wall of the casing.

When the above described variable resistance is to be used to control the speed of the motor M within the housing 2, the rheostat operated by the handle of the prior patent is removed and a lead from one terminal 18 is connected to one side of the motor, FIG. 2, and a lead from the contact member 24 is connected to one pole of a double-pole double-throw switch arm S. The switch arm S, which is located near the steering wheel 8 on a simulated dash-board (not shown) and which was formerly used for controlling the motor speed may be used for reversing the current to the motor M for driving the vehicle 4 in a selected direction.

Having thus described the invention with the particularities required by the statutes, it is understood that obvious changes may be made by those skilled in the art without departing from the scope and spirit of the invention as defined by the following claims:

What is claimed is:

1. A variable resistance device comprising,
a flat rectangular casing,
an elongated resistance element within the casing extending in a predetermined plane,
an insulated arm within the casing pivotally mounted for movements parallel to said plane,
a conductive element on said arm for movements therewith and in contact with the resistance element,
a foot-operated control member overlying the casing and mounted thereon for pivotal movements transverse to said plane toward and from the casing,
means operated by the control member in its movements for rotating the arm to sweep the conductive element along the resistance element,
the foot-operated member comprising a plate element having a depressed portion forming a groove therein, and a shaft extending along the bottom of the groove and supported at its ends by the casing for pivotably mounting the plate to the casing.

2. A variable resistance according to claim 1 wherein the insulated arm is a resilient member of insulating material for biasing the conductive element against the resistance element.

3. A variable resistance according to claim 2 including means to normally bias the pedal away from the casing.

4. A variable resistance according to claim 3 wherein the foot-operated control member includes a planar top wall and depending side wall,
said casing including a top wall and depending side walls,
one of the side walls of the casing being in the path of movement of one of the side walls of the pedal member when in its raised position by the spring to form a limit stop therefor.

5. A variable resistance according to claim 1 including spring means between the casing and plate member for normally biasing the plate away from the casing.

* * * * *